Feb. 13, 1962  C. R. KIRK  3,020,994
DEPOSIT RECEIVING AND RECORDING MACHINE
Filed May 10, 1956  6 Sheets-Sheet 1

INVENTOR.
CLAUDE R. KIRK
BY
ATTORNEY

Feb. 13, 1962
C. R. KIRK
3,020,994
DEPOSIT RECEIVING AND RECORDING MACHINE
Filed May 10, 1956
6 Sheets-Sheet 2
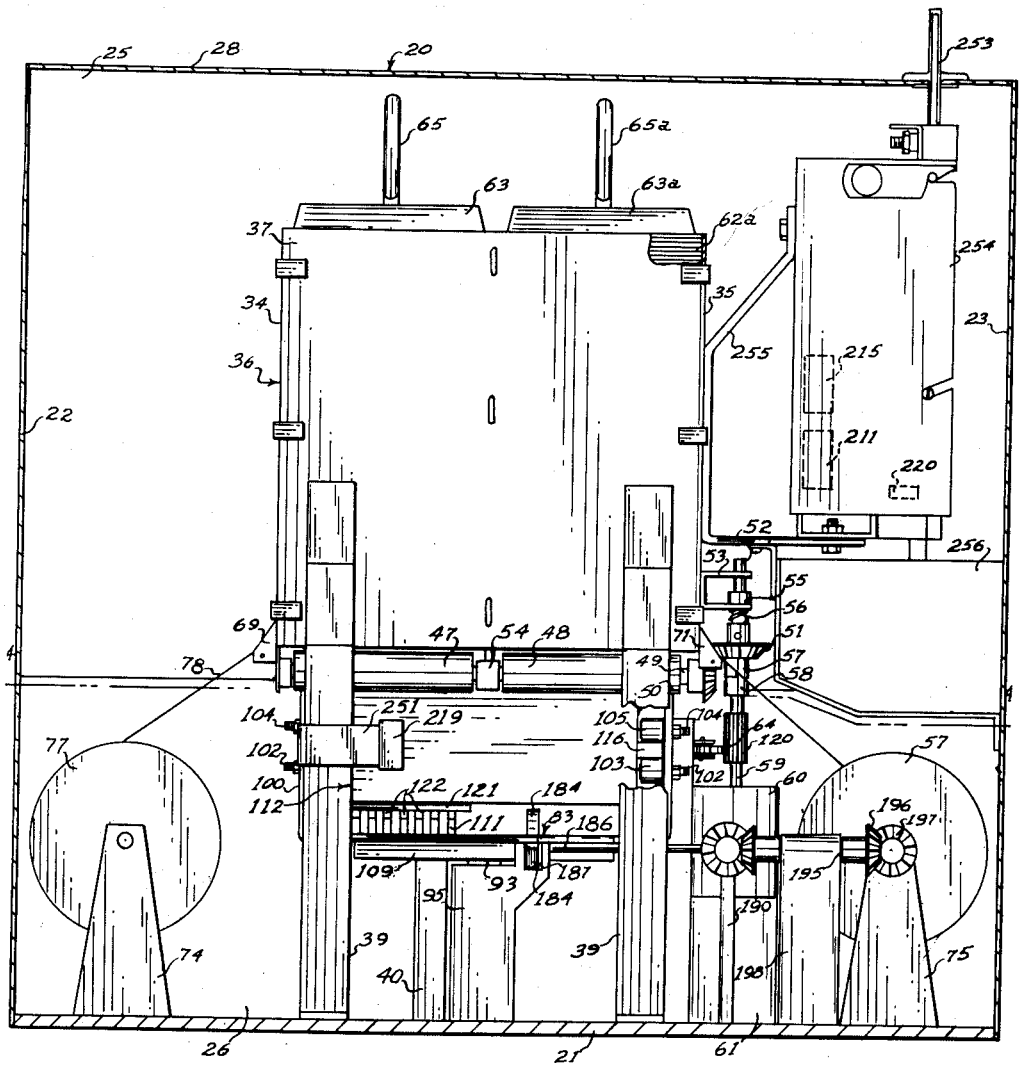
Fig. 3
INVENTOR.
CLAUDE R. KIRK
BY
ATTORNEY Feb. 13, 1962 C. R. KIRK 3,020,994
DEPOSIT RECEIVING AND RECORDING MACHINE
Filed May 10, 1956 6 Sheets-Sheet 3
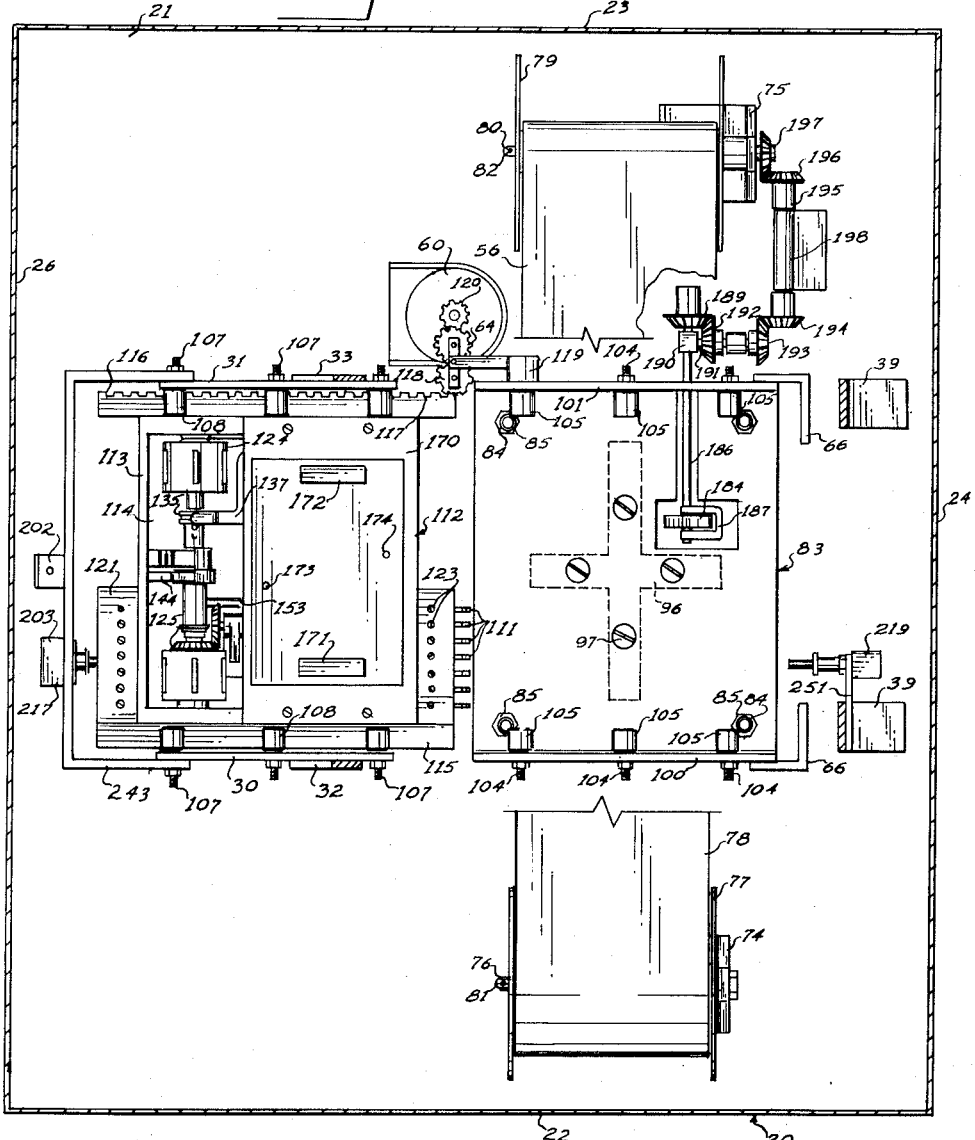
Fig. 4
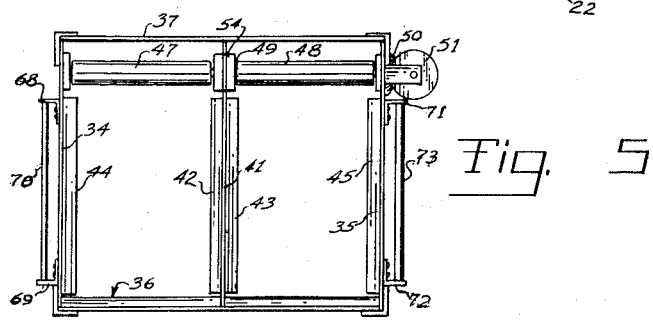
Fig. 5
INVENTOR.
CLAUDE R. KIRK
BY
ATTORNEY Feb. 13, 1962   C. R. KIRK   3,020,994
DEPOSIT RECEIVING AND RECORDING MACHINE
Filed May 10, 1956   6 Sheets-Sheet 4
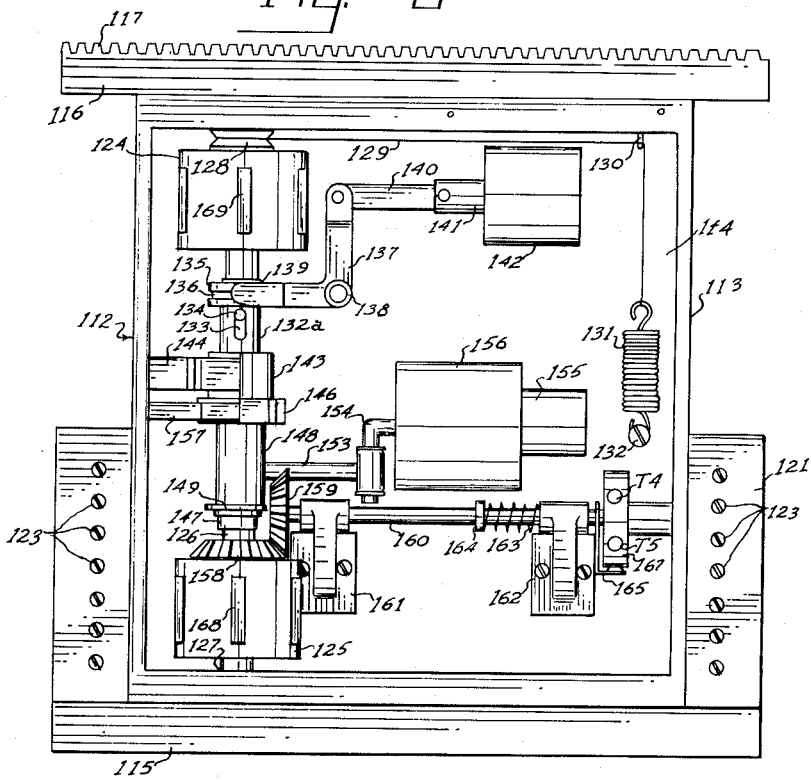
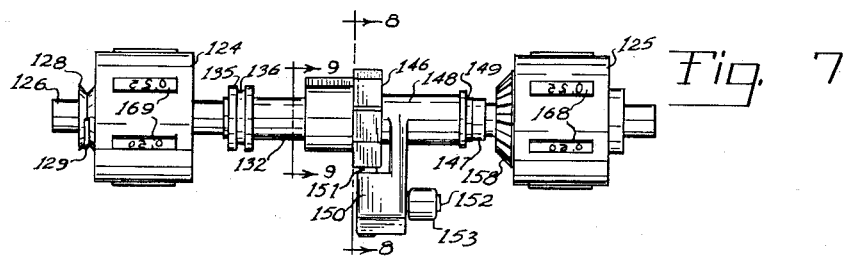
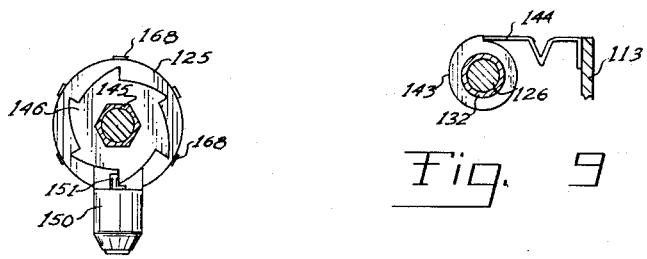
INVENTOR.
CLAUDE R. KIRK
BY
ATTORNEY Feb. 13, 1962

C. R. KIRK 3,020,994

DEPOSIT RECEIVING AND RECORDING MACHINE

Filed May 10, 1956

INVENTOR.
CLAUDE R. KIRK
BY
ATTORNEY

Feb. 13, 1962  C. R. KIRK  3,020,994
DEPOSIT RECEIVING AND RECORDING MACHINE
Filed May 10, 1956  6 Sheets-Sheet 6

INVENTOR.
CLAUDE R. KIRK
BY
ATTORNEY

United States Patent Office 3,020,994
Patented Feb. 13, 1962

3,020,994
DEPOSIT RECEIVING AND RECORDING MACHINE
Claude R. Kirk, 412 Bibb St., Montgomery, Ala.
Filed May 10, 1956, Ser. No. 584,035
8 Claims. (Cl. 194—10)

This invention relates to deposit receiving and recording machine and more particularly to a machine which will simultaneously record the value of coins received therein together with the name of the depositor.

It is often desirable to have a machine which will receive one or a plurality of coins as a deposit or payment of a debt and dispense to the payor a receipt for such payment for the payee. Such a machine might have widespread use in any business normally receiving deposits or like payments. For example, the banking or insurance firms could utilize such a machine to receive deposits and premiums respectively.

In the past, widespread use has been made of machines which issue to the payor an insurance policy on which a face value is recorded in accordance with the number of coins received by the machine. In this particular prior art machine, the payor signs the policy, a carbon copy of which is retained by the machine. Of course, machines of this type are open to the public and usually anyone desiring insurance protection is free to utilize the same. Thus, no selection of policy holders by the company is possible.

State laws usually prevent the above described prior art machine from being employed for selling life and casualty insurance except to individuals involved in interstate travel. These state laws normally require that an insurance policy be sold by a licensed agent of the company; however, these state laws do not prevent a company from increasing the face value or coverage of the individual, once the basic policy is sold. It is, therefore, seen that if some method of identification of the individual, such as by means of an identification plate or the like, could be delivered to the policy holder concurrently with the basic policy, machines could then be utilized to "boost" or increase coverage temporarily for the individual over specified periods of time and/or for specific events.

Briefly, to satisfy the needs described above, I have devised a machine which is adapted to receive one or a plurality of coins which, through appropriate mechanism to be described hereinafter, causes indexing of a scribe means within the machine to a position determined by the number of coins so received. My machine comprises a carriage which receives an identification plate and positions the same within the machine so that suitable indicia on the scribe means and on the identification plate are urged into registry with one sheet or a plurality of sheets which become the records of the particular transaction. Of course means, such as printing tape, is employed to transcribe the particular indicia configuration of the scribe means and identification plate on the sheet or sheets. In the cycle of my machine, it is contemplated that at least one sheet forming the record of the transaction be dispensed to the payor.

Accordingly, it is an object of my invention to provide a machine which will receive deposits in the form of one or a plurality of coins and will record the value, or a fraction of the value, thereof on appropriate records together with identification data supplied by identification means inserted in the machine.

Another object of my invention is to provide a machine which will automatically receive coins and automatically dispense a sheet forming a record of a transaction on which a value corresponding to the value of the coins is transcribed.

Another object of my invention is to provide a machine suitable for use in boosting or temporarily increasing the face value of an insurance policy.

Another object of my invention is to provide a deposit receiving and recording machine which is efficient in operation, durable in structure and inexpensive to manufacture.

Another object of my invention is to provide a deposit receiving and recording machine which may properly be operated only when an identification plate is inserted in the machine.

Another object of my invention is to provide a deposit receiving and recording machine which will transport an identification plate into registry with a printing tape interposed between the record sheet and identification plate to transcribe data from the identification plate on the record sheet; and then transport the identification plate to a position where the same may be removed from the machine.

Other and further objects and advantages of my invention will become apparent from the following description when taken in conjunction with the accompanying drawings wherein like characters of reference designate corresponding parts throughout the several views and wherein:

FIG. 3 is a rear elevational view of the machine shown in FIG. 1, the back of the housing of said machine being removed.

FIG. 4 is a cross-sectional view taken along line 4—4 in FIG. 3.

FIG. 5 is a reduced scale view of a detail showing a top sectional view of the card holder shown in FIGS. 1 and 3.

FIG. 6 is a top plan view of a detail illustrating the moveable printer assembly of the machine shown in FIG. 1, the identification plate carrier and magnets being removed for purposes of clarity.

FIG. 7 is a front elevational view of a detail showing the scribe means of the machine shown in FIG. 1.

FIG. 8 is a cross-sectional view taken along line 8—8 in FIG. 7.

FIG. 9 is a cross-sectional view taken along line 9—9 in FIG. 7.

Figure 1:
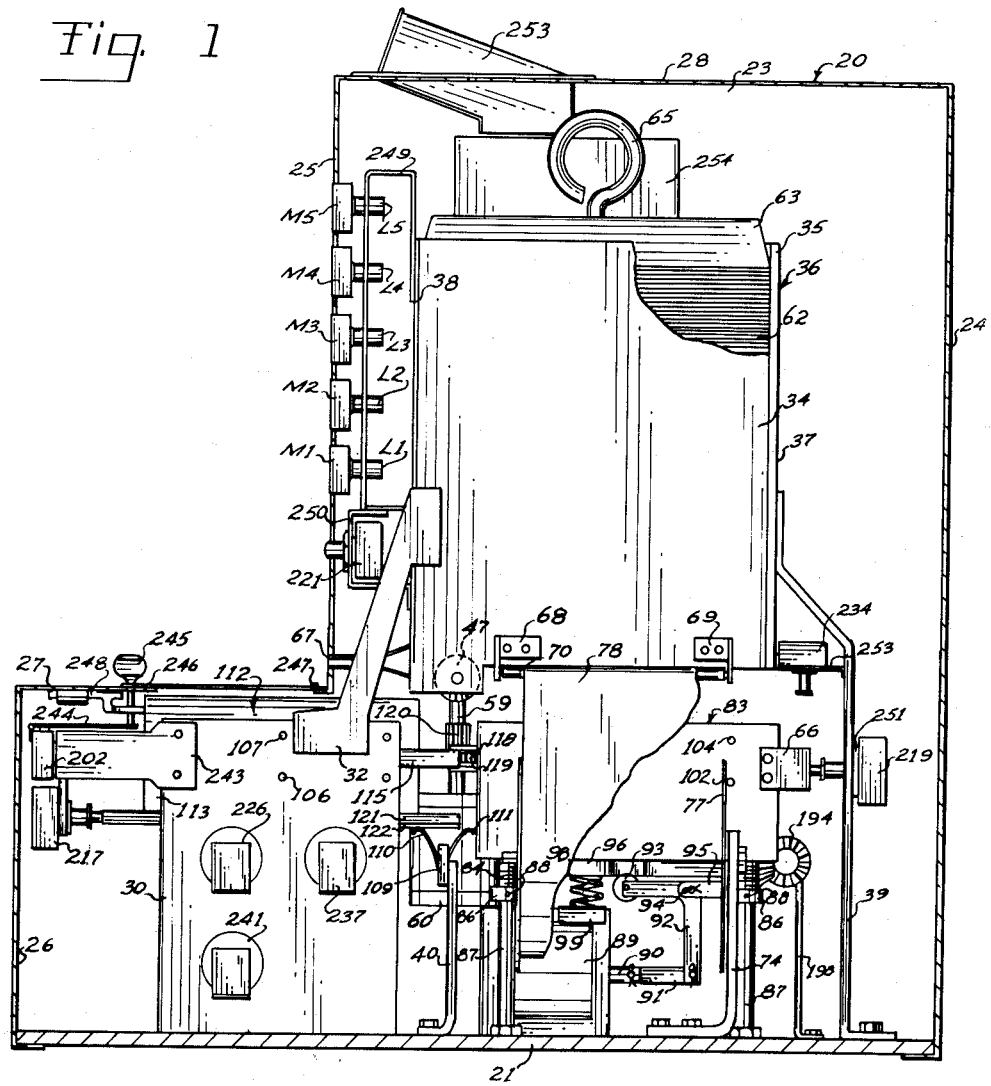
FIG. 1 is a partially broken side elevational view of a deposit receiving and recording machine constructed in accordance with my invention, the side of the housing of said machine being removed to show the internal working of the machine.

Referring now in detail to the single embodiment chosen for purposes of illustration, numeral 20 denotes generally the housing of my invention which includes a base 21, sides 22 and 23, back 24, an upper front 25, a lower front 26, a horizontal front plate 27 and top 28.

Figure 10:
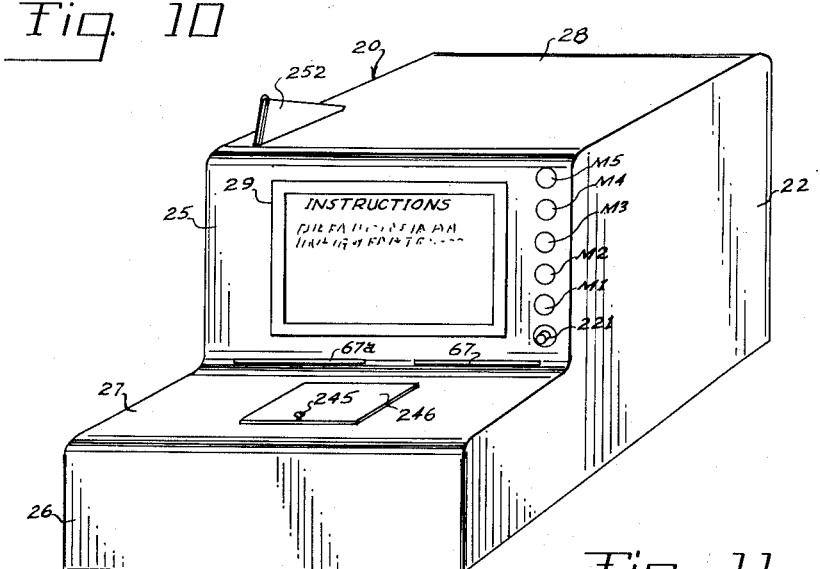
FIG. 10 is a perspective view of the machine shown in FIG. 1.

As will be seen in FIG. 10, suitable instructions for operation of the machine may be placed in an appropriate frame 29 on upper front 25.

Within my machine toward the front portion thereof are a pair of opposed, vertically disposed, roller supporting plates 30 and 31 which are secured to base 21 by bolts or the like (not shown). A pair of spaced supporting straps 32 and 33 extend upwardly and rearwardly, from the upper edges of plates 30 and 31 and are respectively secured to edge of side plates 34 and 35 of a card holder 36. As is best seen in FIG. 1, card holder 36 is disposed vertically in the upper portion of housing 20 between back 24 and upper front 25, and comprises, in addition to side plates 34 and 35, a rear plate 37 and a front plate 38. To provide for further support of card holder 36, a pair of spaced dogleg braces 39 extend between base 21 and rear plate 37.

In the embodiment presently presented, the card holder 36 is divided into two compartments by a vertical partition 41, best seen in FIG. 5, the edges of which are respectively secured to the mid-portions of rear plate 37 and front plate 38, along the lower edge of partition 41, right angular flanges 42 and 43 respectively project toward side plates 34 and 35 while the lower ends of side plates 34 and 35 are turned inwardly to provide flanges 44 and 45 in horizontal alignment with flanges 42 and 43. It is thus seen that I have provided opposed ledges, at the bottom of each compartment of card holder 36, flanges 42 and 44 being the ledges for one compartment and flanges 43 and 45 being the ledges for the other compartment. Bottom edge of plate 37 is also turned inwardly to form an additional supporting ledge.

Adjacent the front end of flanges 42 and 44 is a discharge roller 47, the upper periphery of which is on substantially the same plane with the upper surface of flanges 42, 44. A second discharge roller 48 is disposed similarly, adjacent the front end of flanges 43, 45. Each of discharge rollers 47, 48 is rotatable by a common shaft 49 which passes axially through rollers 47, 48 and is appropriately journalled for rotation by end plates 34, 35 and front stop 54. One end of shaft 49 projects outwardly of end plate 35 and is provided with a beveled gear 50 which meshes with a second beveled gear 51 secured to a vertical shaft 52.

Figure 2:
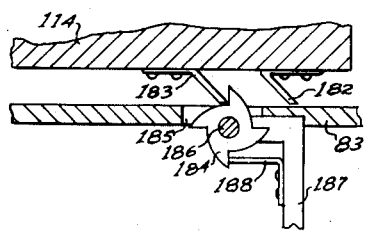
FIG. 2 is an enlarged fragmentary cross-sectional view of a detail showing a portion of the tape advancing mechanism.

Shaft 52 is slideably and rotatably carried by a pair of aligned arms 53 which are fixed to end plate 35 as shown in FIGS. 1-3. A lock washer 55 fixed to shaft 52 prevents downward movement of shaft 52 while a coil spring 56 on shaft 52 between arm 53 and gear 51 residually resists upward movement of shaft 52. On the lower end of shaft 52 is a ratchet drum 57 which meshes with a pawl drum 58. Pawl drum 58 is mounted on the upper end of a drive shaft 59 extending from an electric motor 60 supported from base 21 by block 61.

From FIG. 3 it will be seen that, upon rotation of shaft 59 in a clockwise direction (looking down on the motor), pawl drum 58 engages ratchet drum 57 to rotate the same, thus rotating bevel gear 51 to rotate drive rollers 47, 48 in a counterclockwise direction as viewed in FIG. 1. On the other hand, when shaft 59 is rotated in a counterclockwise direction, ratchet drum 57 will be urged up against spring pressure of spring 56 as pawl drum 58 rotates and thus no rotation of drive rollers 47, 48 occurs.

As seen in FIGS. 1 and 3, each compartment of card holder 36 is provided with a stack of cards or sheets, cards 62 being stacked in one compartment and cards 62a in the other compartment. The side edges of lowermost card 62 in that stack ride on flanges 42, 44 with its front edge riding on the upper periphery of roller 47. Similarly, the lowermost card 62a in that stack rides on flanges 43, 45 and on roller 48. Each stack of cards is weighted by a floating platen, as best seen in FIGS. 1 and 3. The stack of cards 62 is weighted by platen 63 and the stack of cards 62a is weighted by platen 63a. As best seen in FIG. 3, the platens 63 and 63a are respectively provided with hooks 65 and 65a which facilitate their removal from the top of their stacks.

It is now understood that upon rotation of drive roller 47 and 48, the bottom-most cards 62 and 62a are simultaneously moved forwardly within my machine and ejected through a chute 67 and 67a which are respectively affixed in appropriate apertures in the lower portion of upper front 25 and supported by front plate 38.

A pair of opposed brackets 68 and 69 project downwardly and outwardly from the lower edge of side plate 34 to journal therebetween for rotation on idler roller 70 while similar brackets 71 and 72 on end plate 35 journal for rotation a complementary idler roller 73, as best seen in FIG. 5. Rollers 70 and 73 are aligned laterally with each other and are so arranged that their upper peripheries are in a plane immediately below the plane of flanges 42, 43, 44, 45.

In FIGS. 1, 3 and 4 it will be seen that a pair of upstanding supporting arms 74 and 75 are secured to base 21 outwardly on each side of sheet containing card holder 36. Supporting arm 74 is provided with a stub shaft 76 which, in turn, supports for rotation a spool 77 of ink impregnated tape 78. As best seen in FIGS. 1 and 3, tape 78 feeds over idler roller 70, the passes beneath flanges 42, 43, 44, 45 and over idler roller 73 to terminate at a spool 79 adjacent supporting arm 75. Spool 79 is removably fixed to a spindle 80 which is journaled for rotation by supporting arm 75. Cotter keys 81 and 82, respectively projecting through the ends of stub shaft 76 and spindle 80, retain spools 77 and 79 in place.

It will now be seen that upon rotation of spindle 80, spool 79 is rotated to pull tape 78 from spool 77 and move it progressively beneath the sheet containing card holder 36. The apparatus for intermittently rotating spindle 80 will be described hereinafter.

From FIG. 1 it will be seen that, within the space below sheet carrying card holder 36 is a U-shaped cradle denoted generally by numeral 83. Cradle 83 is moveable upwardly and downwardly during the operation of my machine and is provided with a plurality of sleeves 84 which threadably project through the bottom of cradle 83. Sleeves 84 are provided with lock nuts 85 which prevent unintended rotation of sleeves 84. The lower end of sleeve 84 respectively rests on a bearing collar 86 which is fixed to the upper portion of standards 87 by set screws 88. Standards 87, in turn, are anchored to base 21 by threadedly projecting into appropriate apertures therein.

For moving cradle 83 upwardly, a printing solenoid 89 is secured to base 21 below cradle 83. This solenoid 89 is provided with a plunger 90 which moves horizontally and through link 91, actuates the depending arm of a bell crank 92. The other arm of bell crank 92 lies horizontally below cradle 83 and is provided on its end with a roller 93. Bell crank 92 is pivotally supported by a pin 94 which is carried by a finger 95 projecting up from base 21.

Along the bottom of cradle 83, a cross-shaped reinforcing member 96 is secured thereto by bolts 97. To cooperate with solenoid 89, a retraction spring 98 is anchored to platform 99 and is connected to the bottom of cradle 83. Spring 98 always urges cradle 83 downwardly, thereby applying pressure through bell crank 92 and link 91 to maintain plunger 90 in its extended position as shown in FIG. 1 except when solenoid 89 is energized.

It is now seen that upon actuation of solenoid 89, plunger 90 is moved to the left in FIG. 1 and thus moves the depending arm of bell crank 92 to the left to cause bell crank 92 to pivot about pin 94. When bell crank 92 pivots, its horizontally disposed arm pivots upwardly and moves roller 93 along the bottom surface of reinforcing member 96, thereby lifting cradle 83 against tension of spring 98. As cradle 83 is lifted, sleeves 84 are carried upwardly with respect to standards 87; however, when solenoid 89 is no longer actuated, spring 98 retracts cradle 83 which moves downwardly until sleeves 84 rest on collars 86.

As best seen in FIGS. 3 and 4, cradle 83 includes a pair of opposed roller carrying flanges 100 and 101 which are respectively aligned with supporting plates 30 and 31. Flanges 100 and 101 are respectively provided with stop members 66 which project from their rear edge. A plurality of horizontally aligned lower stub shafts 102 project inwardly respectively through flanges 100 and 101 and rotatably receive respectively lower rollers 103. Aligned in a horizontal plane above stub shafts 102 are a plurality of complementary upper stub shafts 104 which also project inwardly from flanges 100 and 101 and receive for rotation upper rollers 105. I have thus provided a pair of rows of rollers 103 and 105 adjacent the inner surface of a roller carrying flange 100 and 105 adjacent flange 101. Similarly, supporting platens 30 and 31 are provided with lower stub shafts 106 and upper stub 107 which project inwardly therefrom. Upper stub shafts 107 are provided with rollers 108 while lower stub shafts 106 are provided with complementary rollers (not shown).

Between supporting plates 30, 31 and cradle 83 is an upstanding arm 40 mounted on base 21. A terminal block 109 at the upper end of arm 40 supports a plurality of spaced laterally aligned, forwardly extending electrical terminals or brushes 110 and a plurality of complementary rearwardly extending brushes 111. The function of these brushes will be described in more detail later.

*Printer assembly*

Mounted for travel in a cycle from a normal position between supporting plates 30 and 31 to a cradled position in cradle 83 is a printer assembly denoted generally by numeral 112. This printer assembly 112 includes a rectangular carriage frame 113 having vertically disposed sides and a bottom 114. Fixed along opposite sides of frame 113 are respectively a pair of runners 115 and 116 which ride between upper rollers 108 and the lower rollers (not shown) to provide support for printer assembly 112. Runner 116 forms a rack having teeth 117 which, as best seen in FIG. 4, mesh with a power transfer gear 118 which in turn meshes with an idler gear 64, both supported for rotation from flange 101 by bracket 119. As seen in FIGS. 3 and 4, gear 64, in turn, meshes with a spline gear 120 which is fixed centrally on shaft 59.

It is now seen that when motor 60 is rotated in one direction, the printer assembly 112 is driven forward into cradle 83, with runners 115 and 116 riding between the upper and lower rollers 103 and 105. If motor 60 is then driven in the other direction, printer assembly 112 is returned to its normal or original position.

Transversely mounted to and below bottom 114 is a rectangular insulator plate 121 which extends beyond frame 113 in either direction so that the same will always be over brushes 110 and 111. A plurality of contact strips 122 which correspond in number and spacing to brushes 110 or 111, extend transversely along the bottom of insulator plate 121. These contact strips 122 are electrically conductive and are secured to insulator plate 121 by bolts 123. As will be pointed out more fully hereinafter, strips 122 conduct electrically to the electrical components of my machine.

Within frame 113 are a pair of spaced printer wheels 124 and 125 which are mounted on a common shaft 126. The ends of shaft 126 are supported for rotation by journals such as journal 127 so that shaft 126 and printer wheels 124 and 125 are free to rotate. As best seen in FIGS. 6 and 7, shaft 126 is provided with a pulley 128 adjacent printer wheel 124. Pulley 128 receives one end of a flexible cable 129, the other end of which feeds through hook 130 to one end of a coil spring 131. The other end of coil spring 131 is anchored by bolt 132 to bottom 114 so that upon rotation of shaft 126, cable 129 will be wound around pulley 128 against spring tension of spring 131.

Slideably mounted on shaft 126 between printer wheels 124 and 125 is a sleeve 132a which is provided with an axially extending slot 133, through which a pin 134 projects through shaft 126. Integrally formed at one end of sleeve 132 is a concentric ring 135 provided with a peripheral groove 136. Adjacent ring 135 is a bell crank 137 pivotally mounted on a pivot pin 138 projecting from bottom 114. One arm of bell crank 137 is in alignment with ring 135 and is provided with a yoke 139 which brackets ring 135. Yoke 139 is provided with inwardly projecting groove followers (not shown) which ride in groove 136. The other arm of bell crank 137 is pivotally connected through link 140 to spring loaded plunger 141 of solenoid 142, the solenoid 142 being mounted on bottom 114. Thus, upon actuation of solenoid 142, plunger 141 moves to the right in FIG. 6 to pivot bell crank 137 and move yoke 139 toward printer wheel 124, thereby moving ring 135 and sleeve 132 toward printer wheel 124.

Integrally connected to sleeve 132 at the end opposite ring 135 is a single tooth reset ratchet 143 the periphery of which is engaged by the end of spring pawl 144 which projects from frame 113 as shown in FIG. 9. Concentrically on the end of reset ratchet 143 is a hexagonal nut 145 which normally projects into a hexagonal opening in printer wheel advance ratchet 146. Printer wheel advance ratchet 146 is a six toothed, evenly spaced ratchet which is journaled for rotation on shaft 126 and is adapted to rotate with sleeve 132 when nut 145 projects into the hexagonal opening of ratchet 146.

Integrally formed with ratchet 146 is journal member 147 which concentrically extends toward printer wheel 125. The periphery of journal member 147 forms a bearing over which is fitted a pivot sleeve 148. Sleeve 148 abuts ratchet 146 and is retained in place by a retainer ring 149. Retainer ring 149 also positions ratchet 146, journal member 147, and pivot sleeve 148 in place axially with respect to shaft 126 since a portion of retainer ring 149 projects into a suitable peripheral groove (not shown) in shaft 126.

Extending from pivot sleeve 148 is a crank arm 150 which carries a spring loaded pawl 151 to engage the teeth of ratchet 146 as shown in FIGS. 7 and 8. Crank arm 150 also has a pivot pin 152 which pivotally receives one end of a connecting rod 153. The other end of connecting rod 153 journals a boss pin 154 connected to plunger 155 of solenoid 156. Solenoid 156 is mounted to bottom 114 so that when solenoid 156 is actuated, plunger 155 moves toward shaft 126 to thereby cause boss pin 154 to move connecting rod 153 to pivot crank arm 150 and index ratchet 146 to cause shaft 126 to be rotated sixty degrees. A detent spring 157 which projects from frame 113 prevents rotation of ratchet 146 during the return stroke of connecting rod 153.

Fixed to shaft 126 adjacent printer wheel 125 is a bevel gear 158 which meshes with bevel gear 159 fixed on the end of switch operating shaft 160. Switch operating shaft 160 is mounted from bottom 114 by bearings 161 and 162 and a coil spring 163 on shaft 160 between fixed collar 164 and bearing 162 urges shaft 160 toward shaft 126 so that bevel gear 159 meshes with bevel gear 158. The free end of shaft 160 carries a contact arm 165 which is adapted to engage any one of six contact terminals T1, T2, T3, T4, T5 or T6, of switch 167 depending upon the radial position of shaft 160.

It is now seen that each time solenoid 156 is energized, shaft 126, and hence printer wheels 124 and 125, are rotated one-sixth of a revolution. It is also noted that printer wheel 124 is provided with six equally spaced scribe members 168 along its periphery and printer wheel 125 is provided with identical scribe members 169 along its periphery. Therefore, each time solenoid 156 is energized, the next successive scribe members 168 and 169 are positioned at top dead center as their respective printer wheels 124 and 125 are rotated.

If, on the other hand, solenoid 142 is actuated, bell crank 137 causes sleeve 132 to slide toward printer wheel 124, thereby carrying ratchet 143 with it and removing hexagonal nut 145 from its hexagonal aperture in advance ratchet 146. The pull of spring 131 on cable 129, causes pulley 128 to rotate shaft 126 until the single tooth of reset ratchet 143 strikes pawl 144.

In FIG. 4 it is seen that I have provided an identification plate carrier 170 on the top of the printer assembly 112. This carrier 170 is a flat rectangular member secured in place by bolts or the like and contains a pair of permanent magnets 171 and 172. Also a pair of upstanding dowel pins 173 and 174 are provided on carrier 170. These dowel pins 173 and 174 are off of the center line so that an identification plate 175, shown in FIG. 16, will be received on carrier 170 only when it is accurately positioned with respect to the printer assembly 112 and the dowel pins 173 and 174 project through holes 176 and 177 respectively.

Figure 16:
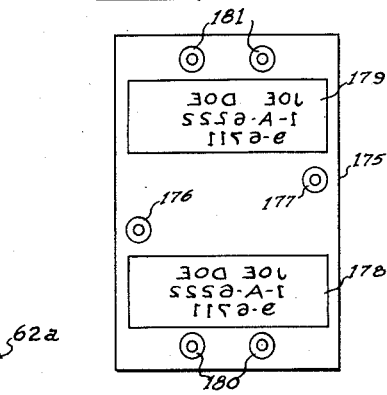
FIG. 16 is a front view of an identification plate suitable for use in the machine of this invention.
Figure 13:
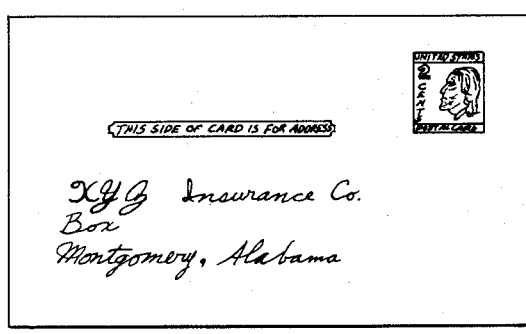
FIG. 13 is a front elevational view of a second postal card suitable for use in the machine of this invention.
Figure 14:
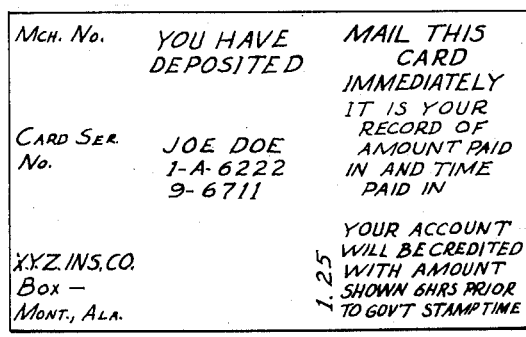
FIG. 14 is a rear elevational view of the postal card shown in FIG. 12, the name of the payor and the amount deposited being inscribed thereon by the machine of this invention.
Figure 15:
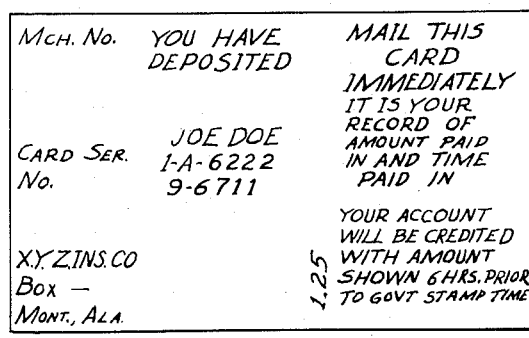
FIG. 15 is a rear elevational view of the postal card shown in FIG. 13, the name of the payee and the amount deposited being inscribed thereon by the machine of this invention.

From FIG. 16 it will be seen that the identification plate 175 has a pair of spaced printing sections 178 and 179 on which raised indicia are contained. Also, ferrous metal grommets 180 and 181 are provided adjacent the edge of identification plate 175 so that magnets 171 and 172 firmly attract and retain the identification plate 175.

As shown in FIG. 2, a pair of aligned pawls 182 and 183 project down from bottom 114 of printer assembly 112. These pawls 182 and 183 are adapted to engage and rotate a ratchet 184 which projects up through an opening 185 in the bottom of cradle 83. The shaft 186 to which ratchet 184 is affixed is rotatably received by a brace 187 which projects from finger 95. A detent 188 projects from brace 187 to engage ratchet 184, thereby preventing rotation of ratchet 184 except in one direction. It will be understood that pawls 182 and 183 are sufficiently flexible that they will ride up and over ratchet 184 when printer assembly is returning to its original or normal position.

As best seen in FIGS. 3 and 4, a bevel gear 189 is provided on the end of shaft 186 and a bearing block 190 supports shaft 186. Bearing block 190 extends from base 21 and journals a transfer shaft 191 which has on one end a bevel gear 192 meshing with bevel gear 189. On the other end of shaft 191 is a bevel gear 193 which meshes with a bevel gear 194. Bevel gear 194 drives through an appropriate shaft 195, bevel gear 196 which meshes with bevel gear 197. Shaft 195 is supported for rotation by bearing block 198 extending up from base 21.

Bevel gear 197 is fixedly concentrically at the free end of spindle 80 so that spool 79 is rotated upon rotation of ratchet 184, to thereby intermittently pull ink impregnated tape 78 through my machine.

Wiring diagram

Figure 11:
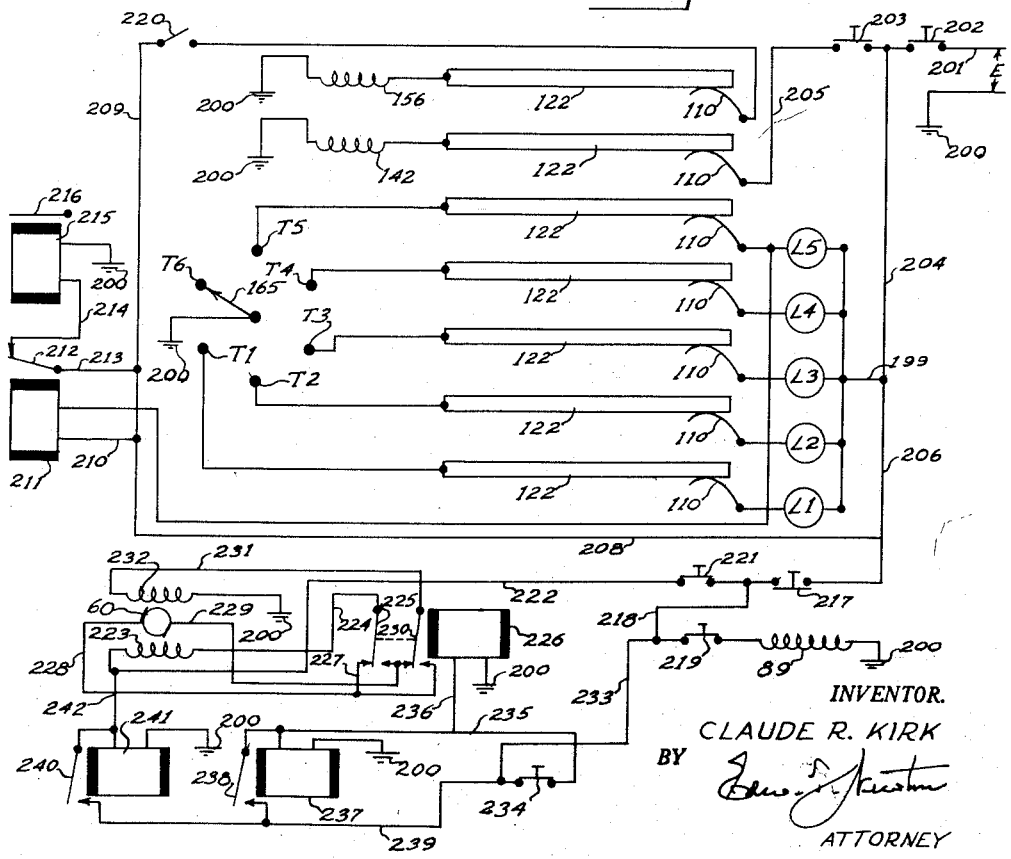
FIG. 11 is a schematic wiring diagram of the electrical circuit of the present invention.
Figure 12:
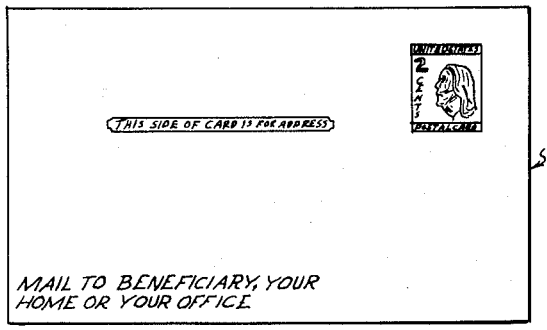
FIG. 12 is a front elevation view of a postal card suitable for use as a sheet in the machine of this invention.

In FIG. 11 the wiring diagram of my machine is shown, it being understood that the wires are deleted from the other drawings for purposes of clarity. In FIG. 11, I have provided a source of current E which may be either A.C. or D.C. One wire leads from the source of current and is grounded to the machine at ground 200. It will be understood that my machine is made essentially of metal and therefore a ground at any part of my machine will lead to ground 200. The other wire 201 from the source of current leads to a normally open door switch 202 and thence separates to supply current to a normally open printer reset switch 203 and wire 204. Switch 203, when closed, supplies current through wire 205 to appropriate pair of complementary brushes of brushes 110 and 111, through one of contact strips 122 and the coil of solenoid 142 to ground 200.

Wire 204 supplies current to wire 199 and thence simultaneously to the parallel connected lights L1, L2, L3, L4 and L5. Lights L1, L2, L3, L4, and L5 are respectively connected through an appropriate pair of complementary brushes of brushes 110 and 111 and appropriate contact strips 122 to terminals T1, T2, T3, T4 and T5. When contact arm 165 engages any one of terminals T1, T2, T3, T4 or T5, a circuit is made to ground 200 and the appropriate light L1, L2, L3, L4 or L5 is lighted. Of course, as long as contact arm 165 engages terminal T6, no circuit is completed and no light is lighted.

Wire 204 also supplies current to wire 206 and thence through wires 208, 209 and 210 to the coil of relay 211 which is grounded through brushes 110, 111 and contact strip 122 to terminal T5 when contact arm 165 engages terminal T5. Thus, when contact 165 is contacting terminal T5, relay 211 opens its normally closed switch 212 to break a circuit from wire 209 through wire 213 and 214 to a coin reject coil 215 to ground 200. This coil 215 releases a coin return finger 216 which returns to the operator all coins received thereafter by my machine.

From wire 209, current is supplied through normally open coin chute switch 220 through a pair of complementary brushes of brushes 110 and 111 and a contact strip of strips 122 through advance solenoid 156 to ground 200 so that upon each closing of switch 220, solenoid 156 is actuated.

Further, wire 204 supplies current through a normally closed main reset switch 217 and wire 218 to a normally open printing switch 219 and thence through printing solenoid 89 to ground 200. Current is also supplied from reset switch 217 to a normally open motor supply switch 221 through wire 222 on field coil 223 of motor 60. From field coil 223 wire 224 leads to a switch 225 of a double pole double throw motor reversing relay 226, which normally engages its terminal to wire 227 to thereby feed current through wire 228 to the armature of motor 60 and from there through wire 229 to the normally unengaged terminal of switch 230 and also to a normally engaged terminal of switch 230 of relay 226. Contact switch 230 leads through wire 231 to field coil 232 and to ground 200. Wire 228 leads also to the normally unengaged terminal of switch 230 so that when the coil of relay 226 is de-energized, current flow from switch 221 through appropriate wiring just described and through switches 225 and 230 to the field coils 223 and 232 and armature of motor 60 to rotate motor 60 in one direction while, when the coil of relay 226 is energized, switches 225 and 230 are thrown so that current flows in an opposite direction through the armature of motor 60, thereby reversing motor 60.

From wire 218 current is supplied through wire 233 to normally open reverse switch 234 and thence through wire 235 and 236 through the coil of relay 226 to ground 200. Wire 235 also leads to the coil of motor reverse holding relay 237 and then to ground 200 so that each time relay 226 is energized, relay 237 is energized. Relay 237 is provided with a switch 238 when closed by the energizing of relay 237 supplies current from wire 233 through wire 239 to wire 235 and therefore once relay 237 is energized, current is supplied through switch 238 to energize coils of relays 237 and 226 until reset switch 217 is opened. Similarly, wire 239 leads to normally open switch 240 of main holding relay 241. The coil of relay 241 is connected through wire 242 to wire 222 and to switch 240. The other terminal of the coil of relay 241 is grounded at 200. Hence, once switch 221 is closed to supply current to wire 222, main holding relay 241 current is supplied through switch 240 to the coil of relay 241 and current is supplied through wire 242 and 222 to energize motor 60.

Position of electrical equipment

As best seen in FIG. 1, the relays for operating motor 60, namely relays 226, 237 and 241, are mounted on supporting plate 30. The main reset switch 217 and printer reset switch 203 depend from strap 243 which extends between supporting plates 30 and 31. These reset switches 217 and 203 are operated by a single button which is engaged by insulator plate 121 when the printer assembly returns to its normal position. It should be noted that switches 217 and 203 are so arranged that switch 217 is actuated approximately one-tenth of a second before switch 203 is actuated. When actuated, printer reset switch 203 remains closed approximately one-tenth of a second and then automatically opens. Main reset switch 217 opens when actuated, then automatically closes. Also carried by strap 243 is the door switch 202 which is closed by a hinge lever 244 when a locking pin 245 depresses it. As best seen in FIG. 1 a door 246 is hinged to front plate 27 by hinge 247 so that it closes an aperture in front plate 27. Locking pin 245 is carried by door 246 so that when door 246 is closed, pin 245 projects through a spring loaded door latch 248 and depresses hinge lever 244.

In FIG. 1 it will be seen that lights L1, L2, L3, L4 and L5 are carried by strap 249 mounted on front plate 33 of card holder 36. Lights L1, L2, L3, L4 and L5 are arranged vertically in inverse order and are respectively provided with lenses M1, M2, M3, M4 and M5 which project through upper front 25 so that the lights may be observed by the operator. Mounted by bracket 250 below strap 249 is motor supply switch 221 which projects through upper front 25 so that it may be closed by the operator.

At the rear of my machine a finger 251 projects from brace 39 and supports printing switch 219 in a position to be struck by printer assembly 112 when the printer assembly 112 is in its cradled position.

Mounted on a cross-member 253 between brace 39 and rear plate 37 is reset switch 234. Reset switch 234 is in such a position that when printer assembly 112 is carried to its printing position by cradle 83, runner 115 will strike switch 234.

*Coin receiving mechanism*

The coin receiving mechanism of my machine is the usual arrangement of a coin chute 253 which projects through top 28 and a conventional coin acceptance and rejection box 254. Box 254 is mounted by bracket 255 to card holder 36 and feeds accepted coins to coin receiving box 256 supported from bracket 255. The rejected coins, of course, may be fed back to the operator in the usual way. Switch 220 is mounted in the coin chute in the conventional manner so that each accepted coin fed to acceptance box 254 closes switch 220. Also incorporated with coin acceptance box 254 is coin return finger 216 which normally returns all coins to the operator except when solenoid 215 is energized.

The operation and structure of the coin receiving mechanism is well known in the art and hence no detail description of the same is included.

*Operation*

From the foregoing description of my invention its operation is apparent. First, a would-be operator of my machine must have an identification plate such as plate 175 in FIG. 16. This plate may be issued by insurance companies or the like, concurrently with the issue of a "basic policy."

To operate my machine the operator or payee lifts door 246 and inserts identification plate 175 through the aperture onto plate carrier 170. The identification plate 175 must be inserted face up as shown in FIG. 16 so that dowel pins 173 and 174 project through holes 176 and 177 respectively. Of course if identification plate 175 is inserted face down, holes 176 and 177 will not align themselves with dowel pins 173 and 174 thereby eliminating possibility of inserting identification plate 175 upside down. When properly inserted, identification plate 175 is firmly held in place on identification plate carrier 170 by the magnets 171 and 172.

Next the operator closes door 246, thereby causing locking pin 245 to depress lever hinge 244 to close switch 202. The closing of switch 202 thus supplies current from a source of current E to my machine and energizes solenoid 215 to retract coin return finger 216. Thereafter, the operator inserts one to five coins in coin chute 253. As each coin in accepted, switch 220 is closed to thereby momentarily energize solenoid 156. Solenoid 156, in turn, actuates plunger 155 to cause it to travel to the left in FIG. 6, thereby moving connecting rod 153 a sufficient distance to rotate ratchet 146, one-sixth a revolution where detent spring 157 catches and holds ratchet 146. Since ratchet 146 is linked through nut 145 to ratchet 143 which, in turn, is locked rotationally to shaft 126 by pin 134, ratchet 143 and shaft 126 are advanced one-sixth a revolution. Printer wheels 124 and 125 are also advanced one-sixth a revolution and thus with successive coins, successive scribe members 168 and 169 are brought into printing position at top dead center.

It is now readily seen that as each successive coin is received and accepted by my machine, printer wheels 124 and 125 are rotated a sufficient fraction of a revolution to position the next successive scribe means 168 and 169 in a printing position. Therefore, with appropriate indicia on scribe means 168 and 169, a function of value of the coins received may be indicated by the particular scribe means 168 and 169 which are in the printing position.

It is to be remembered that shaft 160 is geared to shaft 126 and that contact arm 165 is carried by shaft 160. Therefore, the rotation of shaft 126 causes shaft 160 to rotate contact arm 165 from its open circuit position at terminal T6 to terminal T1 upon the receipt of the first coin by my machine, and then to terminal T2 upon the receipt of the second coin, etc. Upon the contacting of terminal T1 by contact arm 155, a circuit through light L1 is completed and light L1 is lighted to indicate to the operator that the machine is operating properly. Similarly with subsequent indexing of printing wheels 124 and 125, contact arm 165 is rotated to terminals T2, T3, T4 and T5 to complete circuits to lights L2, L3, L4 and L5 respectively, thereby indicating that subsequent coins have caused actuation of the mechanism and indexing of printing wheels 124 and 125.

When the operator has inserted the maximum number of coins (in the present embodiment, five coins), and contact arm 165 engages terminal T5, a circuit is completed through the coil of relay 211 to open switch 212, thereby de-energizing solenoid 215 and releasing coin reject finger 216. Thereafter all subsequent coins inserted in chute 253 are rejected. In event of power failure, reject finger is also released by de-energizing of solenoid 215.

When the desired number of coins have been inserted in coin chute 253, and the appropriate light L1, L2, L3, L4 or L5 lighted in response thereto, the operator depresses panel switch 221 which completes a circuit to motor 60 and simultaneously to main holding relay 241, thereby causing rotation of shaft 59 in a counter-clockwise direction as viewed in FIG. 4. Therefore spline gear 120 rotates gear 72 which in turn rotates gear 118 to drive rack or runner 116 to move the printer assembly 112 rearwardly from its normal position between supporting plates 30 and 31 to its cradled position in cradle 83. As printer assembly 112 is moved rearwardly, it releases door latch 248 to engage pin 245 and lock door 246 closed. As printer assembly 112 continues to move rearwardly, pawls 182 and 183 thereon engage ratchet 184, thereby causing shaft 186 to rotate, through shaft 195 and spindle 80, spool 79. Thus spool 79 advances ink impregnated tape 78 a short distance.

Printer assembly 112 continues its travel rearwardly until it strikes stop members 66 and rests entirely on lower rollers 103. When the printer assembly 112 moves entirely into cradle 83, printer assembly 112 strikes printing switch 219 to momentarily complete a circuit to solenoid 89. With solenoid 89 momentarily energized, plunger 90 moves forwardly to pivot bell crank 92 so that its horizontal arm moves roller 93 upwardly and rearwardly to lift cradle 83. When cradle 83 is lifted, carrying the printer assembly 112 therein, scribe means 168 and 169 and printing section 178 and 179 are brought into registry with ink impregnated tape 78 so that the indicia on scribe means 168 and printing section 179 print onto the lowermost card 61 and the indicia on scribe means 169 and printing section 178 print onto the lowermost card 62. Thereafter, cradle 83 and printer assembly 112 return to the cradled position due to the automatic de-energizing of solenoid 89.

It will be noted that motor 60 is still energized; however, as printer assembly 112 and cradle 83 move into registry on the printing position, runner 115 strikes reverse motor switch 234 which supplies current to the coil of motor reversing relay 226 and the coil of reverse holding relay 237. Thus, the direction of rotation of motor 60 is reversed and printer assembly is moved against front stop 54, until cradle 83 returns to its normal position. After cradle 83 returns to its normal position, the reversal of motor 60 causes printer assembly 112 to return to its normal position.

As printer assembly 112 returns to its normal position, motor 60, acting through shaft 59 rotates pawl drum 58 which engages ratchet drum 57, and rotates shaft 52 and through bevel gears 51 and 50 shaft 49 is rotated to rotate discharge rollers 47 and 48. Thus, as printer assembly 112 returns to its normal position, the lowermost cards 62 and 62a are driven by discharge rollers 47 and 48 out through chutes 67 and 67a respectively.

As printer assembly 112 reaches its normal position, insulator plate 121 strikes reset switches 203 and 217. Reset switch 217 is thus momentarily opened to deenergize the coil of relay 237 and open switch 238, and to interrupt current flowing to motor 60. Thereafter, the closing of reset switch 203 supplies a surge of current to solenoid 142 which moves plunger 141 to the right in FIG. 6. Plunger 141, acting through bell crank 137, ring 135 and sleeve 132, disengages hexagonal nut 145 from advance ratchet 146 and permits spring tension of spring 131 to return shaft 126, printer wheels 124 and 125, shaft 160 and contact arm 165 to their original position, the reverse rotation of these elements being limited by the tooth of reset ratchet 143 striking spring pawl 144.

When printer assembly 112 reaches its normal position, it strikes spring loaded door latch 248 and pushes it forward to release pin 245. The operator may now open door 246 and remove his identification plate 174. My machine is now ready for its next cycle.

Cards 62 and 62a which have been dispensed by my machine in response to the cycle just described have stamped or printed thereon the name of the depositor, purchaser or operator, and the amount of money deposited in the machine. In the present embodiment card 62a is addressed to the insurance company while card 61 may be addressed to the beneficiary. It will be understood by those skilled in the art that in some instances but a single card or sheet may be needed to record the transaction. In other instances perhaps more cards than are illustrated in this embodiment may be used.

It will, however, be obvious to those skilled in the art that many variations may be made in the single embodiment chosen for purpose of illustration, and equivalents may be readily substituted therein without departing from the scope of my invention as defined by the appended claims.

I claim:

1. A deposit receiving and recording machine comprising a housing, a door hinged on said housing, a pin on said door projecting into said housing when said door is closed, an on-off switch mounted below said pin to be closed when said pin projects into said housing, a motor actuating switch connected in series with said on-off switch, a moveable printer assembly within said housing, supporting means for normally supporting said printer assembly adjacent said door, a moveable cradle adjacent said supporting means adapted to receive said printer assembly from said supporting means, a card chute positioned over said cradle, a reversable motor connected through said on-off switch and said motor actuating switch to a source of current, drive means connected to said motor for moving said printer assembly from said support means to said cradle and from said cradle to said support means, tape printing means interposed between said chute and said cradle, means for moving said type printing means, electro-mechanical means actuatable when said printer assembly is received by said cradle to move said cradle and said printer assembly into printing position with respect to a card carried by said chute.

2. A deposit receiving and recording machine comprising a housing, a door hinged on said housing, a pin on said door projecting into said housing when said door is closed, an on-off switch mounted below said pin to be closed when said pin projects into said housing, a moveable printer frame within said housing, supporting means for normally supporting said printer frame adjacent said door, a moveable cradle adjacent said supporting means adapted to receive said printer frame from said supporting means, a card chute positioned over said cradle, a printer wheel on said frame, a multi-terminal switch on said frame, a coin chute projecting through said housing through which a plurality of coins may be introduced into said machine, means for indexing said printer wheels in response to the number of coins received by said machine, means for indexing said multi-terminal switch concurrently with the indexing of said printer wheels, a plurality of lights mounted on said machine, circuits leading from a source of current through said on-off switch and through said multi-terminal switch to said lights for lighting certain of said lights when said switch is in certain positions, a motor connected to said source of current, drive means connected to said motor for moving said printer frame from said support means to said cradle and from said cradle to said support means, tape printing means interposed between said chute and said cradle, electro-mechanical means actuatable when said printer frame is received by said cradle to move said cradle and said printer frame into printing position to print indicia from said printer wheel onto a card mounted in said chute, means for dispensing a card after printing, and means for returning said printer wheel from its indexed position.

3. A deposit receiving and recording machine comprising a housing, a door hinged on said housing, a pin on said door projecting into said housing when said door is closed, an on-off switch below said pin closeable when said pin projects into said housing, a moveable printer frame within said housing, supporting means for normally supporting said frame adjacent said door, a moveable cradle adjacent said supporting means adapted to receive said printer frame from said supporting means, a card chute positioned over said cradle, a printer wheel on said frame, a multi-terminal switch on said frame, a coin chute projecting through said housing through which a plurality of coins are introduced into said machine, means for indexing said printer wheels in response to the number of coins received by said machine, means for indexing said multi-terminal switch concurrently with the indexing of said printer wheels, a plurality of lights mounted on said machine, circuits leading from a source of current through said multi-terminal switch to said lights for lighting certain of said lights when said switch is in certain positions, a reversible motor, drive means connected to said motor for moving said printer frame from said support means to said cradle when said motor is actuated to rotate in one direction and from said cradle to said support means when said motor is actuated in the opposite direction, tape printing means interposed between said chute and said cradle, switch means for actuating said motor, electro-mechanical means actuatable when said printer frame is received by said cradle to move said cradle and said printer frame into printing position to print indicia from said printer wheel onto a card mounted in said chute, means for dispensing a card after printing and means for returning said printer wheel to its unindexed position.

4. In a machine of the class described wherein a sheet is printed by movement of a printer assembly into registry with a sheet, a pair of spaced printer wheels in said printer assembly, means for moving said printer assembly into and out of printing engagement with said sheet, scribe means arranged around the peripheries of said printer wheels, a shaft connected between said printer wheels for rotating each printer wheel to bring one scribe means on each printer wheel to a position for printing engagement with a sheet, ratchet means connected to said shaft, a pawl engaging said ratchet means, electro-mechanical means for rotating said shaft in one direction a predetermined fraction of a revolution, spring means for resiliently resisting the rotation of said shaft in said direction, said pawl and ratchet means normally preventing rotation of said shaft in the opposite direction, and means for disengaging said ratchet and pawl after movement of said printer assembly into printing engagement with said sheet to permit said spring means to return said shaft to its original position.

5. The structure defined in claim 4 including a plurality of signaling lights on said machine, and switch means connected to said shaft for selectively energizing said lights in response to the angular position of said shaft.

6. In an apparatus of the class described, a moveable printer assembly, a cradle positioned adjacent said printer assembly, means on said cradle for receiving said printer assembly, means for moving said printer assembly into and out of said cradle, a switch adjacent said cradle in a position to be struck by said printer assembly when said printer assembly is positioned in said cradle, and means actuatable by said switch for moving said printer assembly into printing engagement with a sheet to be printed.

7. In an apparatus of the class described, a printer assembly for printing a positioned card, said printer assembly being moveable into printing registry and out of printing registry with said card, a reversable motor assembly having a shaft for moving said printer assembly to printing registry with said card when said shaft of said motor is rotated in one direction and away from said position when said shaft of said motor is rotated in the opposite direction, a ratchet and pawl assembly connected to said shaft and a roller adjacent said card and connected to said ratchet and pawl assembly whereby said roller is rotated when said shaft is rotated in said opposite direction, the periphery of said roller being engageable with said card for moving the same from its position when said roller is rotated.

8. An apparatus of the class described, a movable printer assembly, a cradle positioned adjacent said printer assembly, means for moving said printer assembly into and out of said cradle, means actuatable by said printer assembly when the same is positioned in said cradle for moving said printer assembly into printing engagement with a sheet to be printed.

References Cited in the file of this patent
UNITED STATES PATENTS

| | | |
|---|---|---|
| 920,995 | Proll | May 11, 1909 |
| 1,251,887 | Hoffman | Jan. 1, 1918 |
| 1,719,497 | Bell | July 2, 1929 |
| 2,059,398 | Roemer | Nov. 3, 1936 |
| 2,295,968 | Poole | Sept. 15, 1942 |
| 2,554,296 | Crews | May 22, 1951 |
| 2,555,148 | Mitchell | May 29, 1951 |
| 2,596,230 | Frick | May 13, 1952 |
| 2,606,494 | Vogt | Aug. 12, 1952 |
| 2,612,428 | Vroom | Sept. 30, 1952 |
| 2,612,976 | Harper | Oct. 7, 1952 |
| 2,627,809 | Worth | Feb. 10, 1955 |
| 2,647,459 | Murphy | Aug. 4, 1955 |
| 2,703,048 | Gandert et al. | Mar. 1, 1955 |
| 2,714,049 | Germann | July 26, 1955 |
| 2,745,341 | Haseloff | May 15, 1956 |
| 2,782,714 | Davidson | Feb. 26, 1957 |